(12) United States Patent
Viglundsson et al.

(10) Patent No.: US 9,051,068 B2
(45) Date of Patent: Jun. 9, 2015

(54) BATCH LOADER

(75) Inventors: Adalsteinn Viglundsson, Reykjavik (IS); Thorir Finnsson, Kopavogur (IS); Sigurdur Skarphedinsson, Kopavogur (IS)

(73) Assignee: MAREL HF, Gardabaer (IS)

( * ) Notice: Subject to any disclaimer, the term of this patent is extended or adjusted under 35 U.S.C. 154(b) by 316 days.

(21) Appl. No.: 13/318,256

(22) PCT Filed: Apr. 28, 2010

(86) PCT No.: PCT/EP2010/055732
§ 371 (c)(1),
(2), (4) Date: Nov. 21, 2011

(87) PCT Pub. No.: WO2010/125111
PCT Pub. Date: Nov. 4, 2010

(65) Prior Publication Data
US 2012/0055760 A1 Mar. 8, 2012

(30) Foreign Application Priority Data

May 1, 2009 (DK) .................................. 2009 70004

(51) Int. Cl.
*B65G 57/06* (2006.01)
*B65B 5/10* (2006.01)
*B65B 25/06* (2006.01)

(52) U.S. Cl.
CPC ............... *B65B 5/108* (2013.01); *B65B 25/065* (2013.01); *B65G 57/06* (2013.01)

(58) Field of Classification Search
CPC .... B65B 5/108; A22C 17/0093; A22C 25/08; B65G 7/06
USPC ..................................................... 198/418.6
See application file for complete search history.

(56) References Cited

U.S. PATENT DOCUMENTS 3,848,725 A  11/1974  Toby
4,128,163 A  12/1978  Rana et al.
(Continued)

FOREIGN PATENT DOCUMENTS

EP  0825139 A1  2/1998
EP  1787910 A1  5/2007
(Continued)

OTHER PUBLICATIONS

International Search Report for International Application No. PCT/EP2010/055732 completed Jun. 29, 2010 and mailed on Aug. 3, 2010.

*Primary Examiner* — Gene Crawford
*Assistant Examiner* — Thomas Randazzo
(74) *Attorney, Agent, or Firm* — Pearne & Gordon LLP

(57) ABSTRACT

The present invention relates to an apparatus for delivering one or more items to a desired position on an item carrier, the apparatus comprising a drop conveyor comprising two conveyor sections that are laterally displaceable and controllable in order to enable dropping the one or more items at a desired position along the length of the drop conveyor, characterized in that the drop conveyor comprises guide means placed above the two conveyor sections, the guide means being laterally displaceable and controllable. The present invention further relates to a method of delivering one or more items to a desired position on an item carrier, the method comprising the steps of positioning the item carrier beneath a drop conveyor, transferring one or more items to the drop conveyor, positioning the items on the drop conveyor, adjusting side guides into contact with the items, and opening the drop conveyor so that the items are dropped.

34 Claims, 5 Drawing Sheets

(56) References Cited

U.S. PATENT DOCUMENTS

Figure 5:
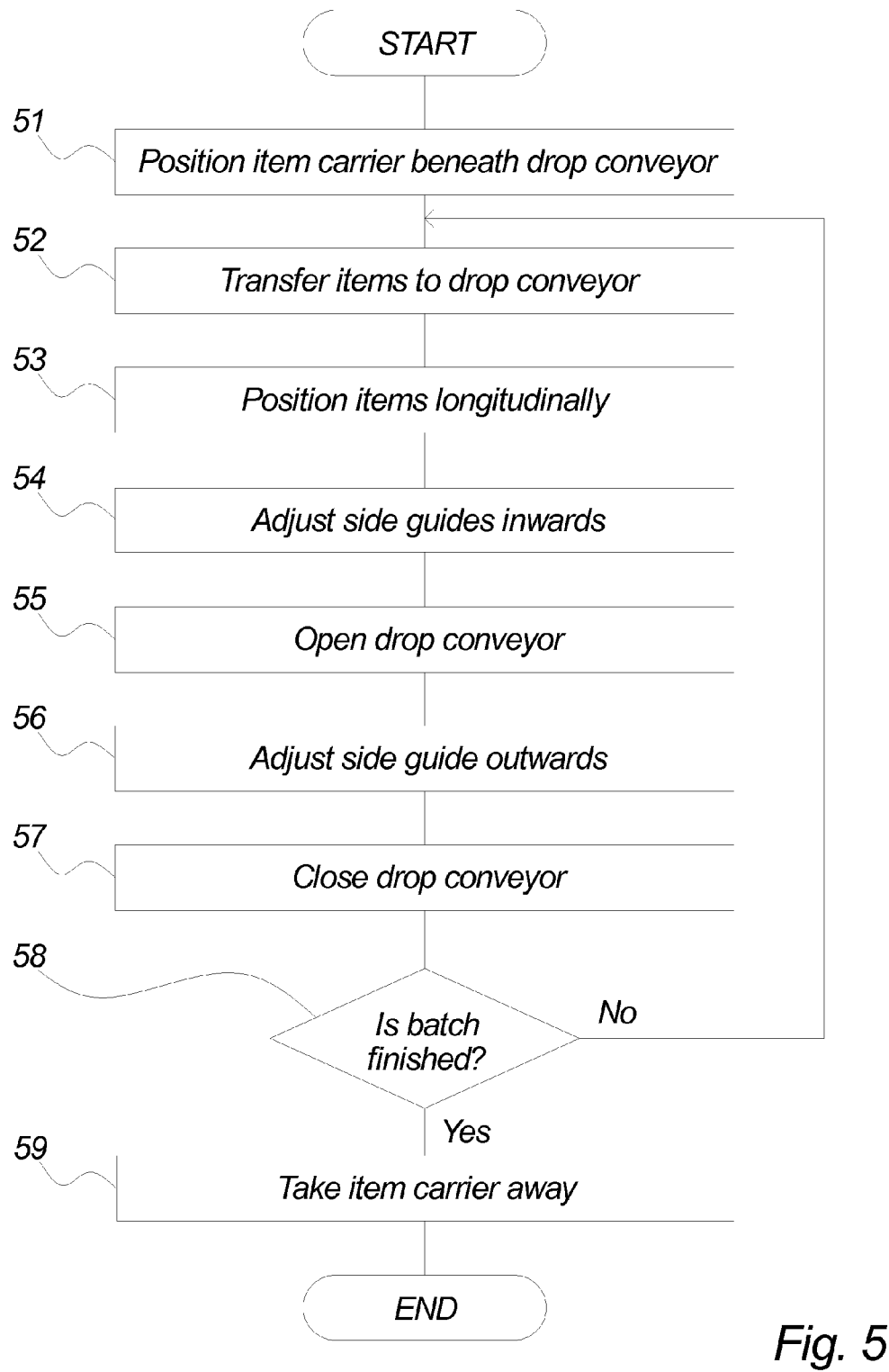

| | | | |
|---|---|---|---|
| 4,262,469 A * | 4/1981 | Ooms et al. | 53/76 |
| 4,925,012 A * | 5/1990 | Guntensperger | 198/690.1 |
| 4,984,677 A * | 1/1991 | Prakken | 198/418.6 |
| 5,022,218 A | 6/1991 | Prakken | |
| 5,070,998 A * | 12/1991 | Nielsen | 198/587 |
| 5,333,721 A * | 8/1994 | Stevie | 198/418.6 |
| 5,901,832 A * | 5/1999 | Woolley et al. | 198/626.3 |
| 6,935,215 B2 * | 8/2005 | Lindee et al. | 83/74 |
| 7,757,462 B2 * | 7/2010 | Harrison et al. | 53/447 |
| 8,002,513 B2 * | 8/2011 | Malenke et al. | 414/790.5 |
| 2004/0069156 A1 * | 4/2004 | Reed et al. | 99/450.1 |
| 2006/0000689 A1 * | 1/2006 | Bekelaar et al. | 198/418.6 |
| 2010/0292828 A1 * | 11/2010 | Einarsson et al. | 700/114 |

FOREIGN PATENT DOCUMENTS

| | | |
|---|---|---|
| FR | 2621885 A1 | 4/1989 |
| GB | 2289032 A | 11/1995 |
| JP | 58104837 A | 6/1983 |

* cited by examiner

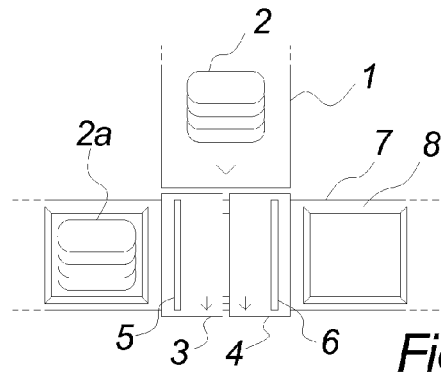 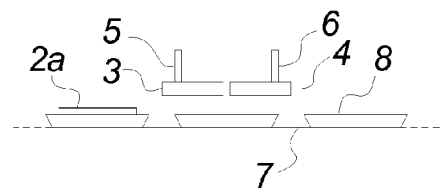
*Fig. 1A*     *Fig. 1B*
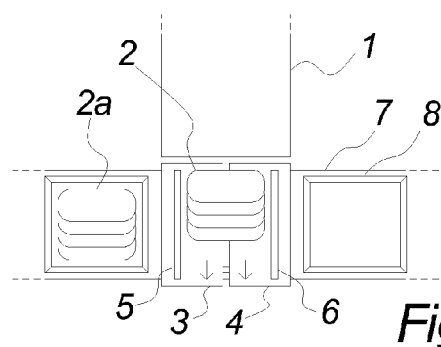 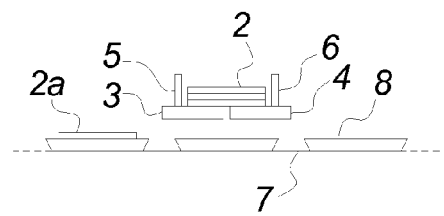
*Fig. 2A*     *Fig. 2B*
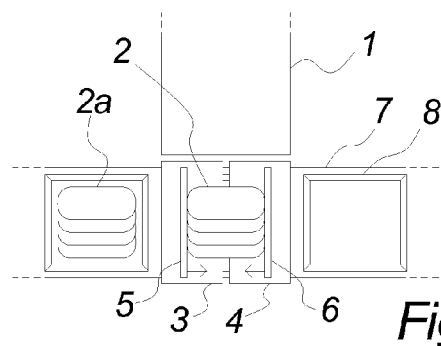 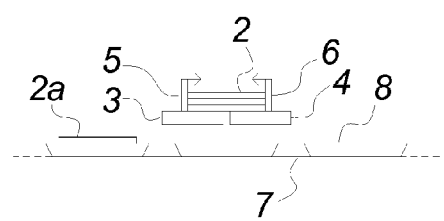
*Fig. 3A*     *Fig. 3B*
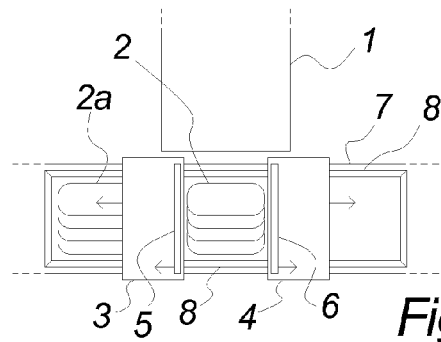 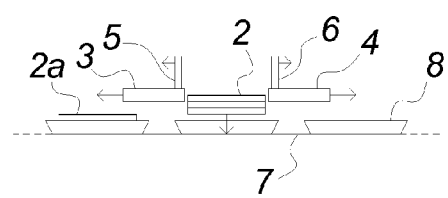
*Fig. 4A*     *Fig. 4B*

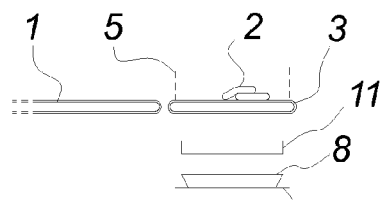 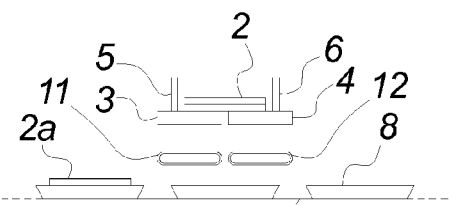
Fig. 6A    Fig. 6B
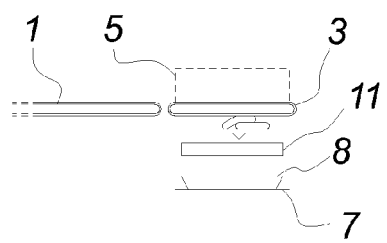 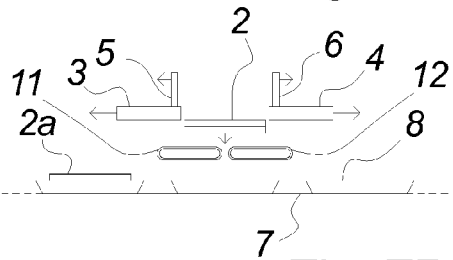
Fig. 7A    Fig. 7B
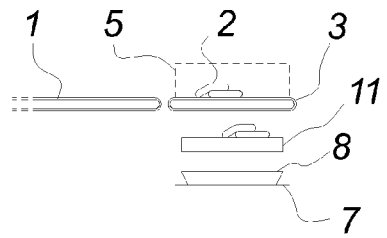 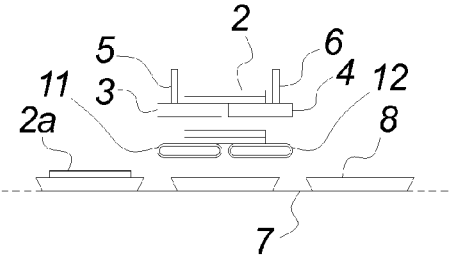
Fig. 8A    Fig. 8B
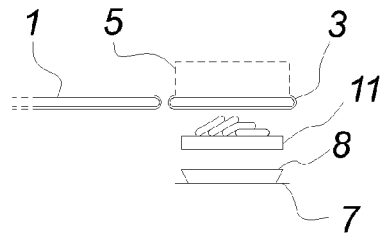 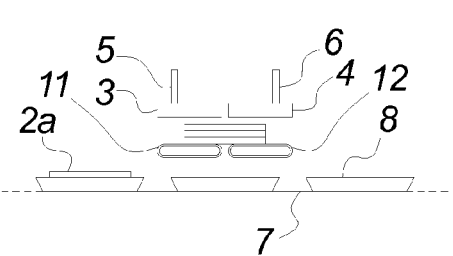
Fig. 9A    Fig. 9B
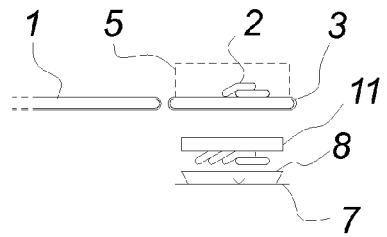 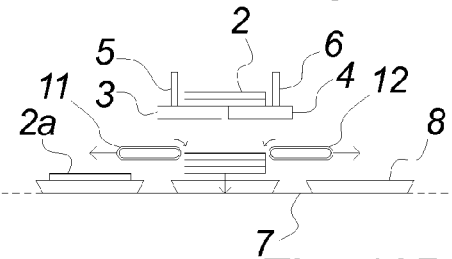
Fig. 10A   Fig. 10B

BATCH LOADER

CROSS-REFERENCES TO RELATED APPLICATIONS

This application is a national stage application of PCT application number PCT/EP2010/055732, filed on Apr. 28, 2010, incorporated herein by reference in its entirety, which claims priority from Danish patent application No. PA 2009 70004 filed on 1 May 2009 and incorporated herein by reference in its entirety.

FIELD OF THE INVENTION

The present invention relates to an apparatus for delivering items, in particular sliced meat items or other relatively flat and floppy items, to a desired position on an item carrier, e.g. a package tray.

BACKGROUND OF THE INVENTION

The task of delivering items from a conveyor system to e.g. a package tray under the requirement that the items are placed neatly, e.g. in a shingle fashion, is often particularly challenging for relatively flat and floppy items such as e.g. sliced or filleted items of meat, poultry or fish, e.g. beefsteaks, pork chops, turkey breast steaks, etc.

Typically the task is performed by delivering the items on a conveyor with a variable end point. By retracting the end point concurrently with the items being delivered to a tray placed immediately below the conveyor, the items will be placed neatly in a shingle fashion in the tray. This conventional method is, however, relatively slow, and it may be useless if the items are not placed correctly on the conveyor at the correct intervals, or e.g. when the items are already placed in a neat, shingle fashion on the conveyor, i.e. completely or partly batched on the conveyor.

As an alternative to the above, a concept has been developed of dropping machines where the items or complete batches are dropped into the package trays by removing their support when positioned directly above the tray.

For example in U.S. Pat. No. 3,848,725, an apparatus for handling meat articles is disclosed, where the articles are delivered to a kind of trap door established by two horizontal banks of rollers arranged in parallel in such a way that the meat articles delivered thereto are supported partly by both rollers. When the meat articles are positioned above the desired position, the roller banks are pivoted 90 degrees downwards around axes corresponding to the outer edges of the roller banks parallel to the transport direction, i.e. in a trap door fashion. The meat articles being equally supported by both roller banks thus loose their support and drops down to the desired position, e.g. a weighing device, a conveyor, a packager, etc. A problem with the trap door approach is, however, that the meat articles may not always drop vertically and neatly, in particular not if the doors do not open exactly uniformly, if the meat articles are not supported exactly equally by both roller banks, or if the meat articles do not stick equally to both roller banks.

For example in European patent application No. 0 359 339 A1, an apparatus for shaping objects such as filled bags and delivering them into boxes is disclosed. The shaping, transportation and positioning is performed by a pair of converging, vertical guide belts, which take a filled bag along on a pair of pivotable flaps, i.e. a trap door arrangement, until it is positioned over an appropriate box. The positioning includes both lateral and longitudinal positioning. The flaps pivot downwardly to vertically drop the bag into the box, while the bag still engages the guide belts to maintain its position. A problem with this apparatus is that it is only able to handle relatively high, squeezable objects, such as filled bags. It would not be possible to position e.g. flat, floppy, sticky pieces of meat by means of vertical guide belts, and the guide belts would neither be able to keep the meat at the correct position upon opening of the trap door.

For example in European patent application No. 0 605 740 A1, an apparatus for transferring bags of items from a conveyor to a box is disclosed. In one embodiment the bags are delivered to a pair of conveyors arranged in parallel in a trap door arrangement. When the bags are at the desired position, a suction unit is lowered into contact with the bags and suction is engaged to keep the bags in place when the conveyor trap door opens. The suction unit holding the bags is further lowered through the trap door opening and into a box positioned beneath. When the bags reach the bottom of the box, the suction is disengaged, the suction unit is raised to its initial position, and the trap door is closed, ready for the next plurality of bags. In another embodiment, it is disclosed that the two parallel conveyors are pulled away from each other horizontally, thereby forming an opening beneath the bags. This embodiment also engages the suction unit to hold the bags and lower them in a controlled way through the opening into a box beneath. Even though both of these embodiments engage the suction unit to ensure that the bags are arranged in the box in the same way as they were on the conveyor, the suction unit also constitutes a major disadvantage in terms of time and complexity. Moreover, even though suction techniques may be readily applicable for handling of plastic bags, the complexity and requirements of the suction unit increase significantly when the task involves handling and neat positioning of items such as flat, floppy pieces of meat.

An object of the invention is to provide an apparatus that can deliver items, including complete or partial batches of items, quickly but also neatly into e.g. trays in a simple fashion.

SUMMARY OF THE INVENTION

The invention relates to an apparatus for delivering one or more items to a desired position on an item carrier, the apparatus comprising a drop conveyor comprising two conveyor sections that are laterally displaceable and controllable in order to enable dropping the one or more items at a desired position along the length of the drop conveyor, characterised in that the drop conveyor comprises guide means placed above the two conveyor sections, the guide means being laterally displaceable and controllable.

The present invention is particularly useful for handling of flat and floppy items such as e.g. sliced or filleted items of meat, poultry or fish, e.g. beefsteaks, pork chops, turkey breast steaks, etc., but any kind of item is within the scope of the present invention.

Be means of the present invention, items may be positioned longitudinally on the drop conveyor by employment of the conveyor sections by simply stopping the driving of the conveyor sections when the items are at the desired position along the length of the drop conveyor.

The embodiments of the present invention do not require any specific origin or pre-processing of the items and the items can be delivered to an apparatus of the present invention in any suitable way, as long as they are either delivered one by one, or in complete or partial batches according to the requirements of the subsequent handling, e.g. packaging.

In the context of the present invention, the term batch is used to denote an amount of individual items that should be handled, e.g. packed, together. The amount may be defined in terms of e.g. number of items, accumulated weight or volume, etc., or combinations thereof. Typically a batch in the present context refers to the smallest amount of items that are to be handled together through to delivery to the end-user, e.g. a pack of 2 beef steaks or 4 lamb chops or 3 chicken breast pieces. It is noted that also a single item may constitute a batch if so desired, for example when the packages should contain about 500 grams, and some of the items weigh about 500 grams alone.

It is noted, that even though the present invention is particularly useful with regard to delivering the items into e.g. trays, boxes or the like, it could also perfectly, within the scope of the invention, be used for delivering items to a conveyor for further processing, or onto a flat packaging material, e.g. a foil. An advantage of using an apparatus according to the present invention for delivering items from one conveyor to another is the option of building complete batches from individual items or partial batches of items, together with the option of discarding certain items, e.g. end pieces, or partial or complete batches, e.g. by driving the items off the end of the drop conveyor, preferably to be received by a further conveyor, a bag or box, etc.

According to the present invention, guide means are provided to facilitate a desired effect on the items prior to and/or during the drop. By employing different control algorithms, the side guides can be employed for producing slightly different effects, with different advantages in different situations. It is noted that, often, the primary use of the apparatus is known at the time of installation and thereby the possibility of changing the effect of the guide means may not be very relevant. Hence, in a simple, preferred embodiment of the present invention the control mechanism is more or less locked to produce a certain effect by the guide means. In a more advanced embodiment, the control mechanism is manually or automatically changed according to changing needs or desires.

The different effects that can be produced by proper control of the guide means alone or in combination with the conveyor sections and other features of the apparatus according to an embodiment of the present invention, comprise, but are not limited to, adjusting the position and/or the extent of the items on the drop conveyor, preferably prior to a drop, retaining the items at the desired position during the horizontal displacement of the conveyor sections, i.e. during the initial phase of a drop, and avoiding that items stick to the guide means during a drop.

Hence, the drop conveyor with guide means according to the present invention facilitates delivery of items, including complete or partial batches of items, quickly but also neatly into e.g. trays in a simple fashion.

According to a preferred embodiment of the present invention, the guide means serve the purpose of retaining the items at the desired position while the conveyor sections are being displaced. Because of the probably considerable and irregular stickiness of the items onto the conveyor sections' belts, at least for the typical kinds of items, e.g. steaks of meat or poultry, and the typical kinds of conveyor belts, there is a high risk that the laterally moving belts will bring the items with them to either side. As this would increase the risk of incorrectly placed or folded or corrugated items in the tray considerably, the guide means are provided to ensure that such displacement of the items does not happen.

According to an embodiment of the invention, the guide means are configured to move towards each other in order to contact said one or more items prior to the two conveyor sections being displaced laterally. Thereby, the effect of adjusting the position and/or extent of the items on the drop conveyor can be obtained, and/or the guide means become ready to retain the items.

According to a preferred embodiment of the invention, the guide means are configured to move away from each other according to a predefined correspondence with a displacement of the conveyor sections, thereby, among other things, enabling the effect of avoiding that items stick to the guide means during a drop.

According to a preferred embodiment of the invention, the apparatus comprises a buffer arranged beneath the drop conveyor so as to receive the items being dropped, the buffer comprising two buffer plates that are laterally displaceable and controllable in order to enable dropping the items from said buffer.

By providing a buffer arrangement between the drop conveyor and the item carriers several advantages are obtained, of which the most important is that a batch of items can be built from partial batches on the buffer and only be dropped into an item carrier when the batch is complete. Thereby, the item carriers need not be positioned beneath the drop conveyor while the batch is built, but can be positioned immediately before the buffer plates opens and the complete batch is dropped. In a system with several processing lines terminated by drop conveyors, but with only one or a few packaging lines to bring and remove item carriers, e.g. a system where a single tray conveyor brings and removes trays from several drop conveyors, the entire system would be stalled each time one of the drop conveyors needed to make two or more drops to establish a complete batch in a tray. However, with the buffer arrangement, an empty tray can just move past a drop conveyor with an incomplete batch and on to the next drop conveyor, because the incomplete batch is positioned on the buffer.

According to a preferred embodiment of the invention, the buffer plates comprise buffer conveyor belts arranged with their direction of transport towards each other, thereby facilitating an uncomplicated drop of the items by diminishing the stickiness of the items to the buffer plates.

According to a preferred embodiment of the invention, the above-mentioned uncomplicated drop is obtained by having the buffer conveyor belts cooperate with the buffer plates and/or a fixed structure of the apparatus to avoid a horizontal displacement of the upper surface of the buffer conveyor belts during a displacement of the buffer plates.

In an embodiment of the invention, the buffer comprises buffer guide means placed above the two buffer plates, and wherein the buffer guide means are laterally displaceable.

According to a preferred embodiment of the present invention, the two conveyor sections and the guide means are coupled directly or indirectly to a control unit for receiving control signals. The controlling of the conveyor section and the guide means comprise several aspects. First, the drop conveyor should be opened and closed at the correct timing to ensure accurate dropping when both the items and an item carrier are in place. To ensure this, the control unit should preferably be provided with information about the positioning of the items on the drop conveyor, and about whether or not e.g. a tray is ready beneath the drop conveyor. In an embodiment featuring the buffer arrangement, the control unit should know about the positioning of items already on the buffer. The information may e.g. be obtained from sensors, scanners or other item sensing devices, e.g. a sensor that senses the entry of an item onto the drop conveyor, which the control unit can combine with information about how far the drop conveyor has moved the item longitudinally. The information about a ready tray may be discarded in a system where strict timing is employed so that a new tray is simply expected to be in the correct position e.g. every 10 seconds, or the tray conveyor could be controlled by information from the control unit so that a tray is always provided immediately before a drop.

Next, the guide means should be controlled so that they produce the above-mentioned effects. This includes e.g. displacing the guide means inwards after the items have been positioned longitudinally, and displacing the guide means outwards at the right time and speed during the opening of the drop conveyor. As mentioned above, the control of the guide means should preferably be in correspondence with the control of the conveyor sections according to a desired algorithm.

Further aspects of the controlling comprise e.g. controlling the building of batches, e.g. on the basis of information from an upstream process unit, e.g. a cutter that provides information about the sequence and number of regular items in the partial batches (which may vary for each piece of e.g. meat), the number of end pieces and other waste located on the conveyor between the usable items, etc.

To this end, in a preferred embodiment of the invention, the control unit is coupled to at least one item sensing device to facilitate dropping the items at a desired position along the length of the drop conveyor and/or information that facilitate establishing batches according to predefined parameters.

Further, the control unit is preferably coupled to at least one process unit, e.g. a cutter, located upstream from the apparatus, to receive information that facilitate dropping the items at a desired position along the length of the drop conveyor and/or information that facilitate establishing batches according to predefined parameters.

According to a preferred embodiment of the invention, the item carrier is a package tray.

According to a preferred embodiment of the invention, the items comprise sliced or chopped food items, e.g. sliced meat, poultry or fish items.

According to an embodiment of the invention, at least two of the items are arranged in the item carrier in a shingle fashion.

The present invention further relates to a method of delivering one or more items to a desired position on an item carrier, the method comprising the steps of
positioning the item carrier beneath a drop conveyor,
transferring one or more items to the drop conveyor,
positioning the items on the drop conveyor,
adjusting side guides into contact with the items, and
opening the drop conveyor so that the items are dropped.

According to the present invention, an advantageous method of delivering items to e.g. a package tray in a neat, uncomplicated and quick manner is provided. It is noted that the step of positioning the item carrier beneath the drop conveyor need not be carried out before the remaining steps, but could within the scope of the present invention be performed at any time up to the time where the items are dropped, i.e. preferably simultaneously with the other steps being carried out.

Be means of the present invention items may be positioned longitudinally on the drop conveyor by employment of conveyor sections by simply stopping the driving of the conveyor sections when the items are at the desired position along the length of the drop conveyor. Preferably the items should have stopped moving before the side guides gets into contact with the items and the drop conveyor is opened. In an alternative embodiment, the characteristics of the items and the available timing may allow performing the steps of adjusting the side guides and opening the drop conveyor while the conveyor sections are still moving. This may improve the efficiency and cause smoother, less jerky influence on the mechanics.

It is further noted that the method is typically, within the scope of the invention, carried out repeatedly with complete or partial batches of items, and in which case, the drop conveyor should be closed and the side guides be adjusted outwards before the next one or more items are transferred to the drop conveyor.

By the step of adjusting side guides one or more of the effects mentioned above, e.g. small adjustments of the position and extent of the items, and a decreased drag of items during opening of the drop conveyor are obtained.

The present invention is particularly useful when e.g. the requirements for an item packaging process include combination of split batches into complete batches, probably with concurrent sorting of usable items and waste. Hence, according to an embodiment of the present invention, the method further comprises the step of evaluating if a complete batch of items has accumulated in the item carrier, and if not, perform the steps of adjusting the side guides outwards, closing the drop conveyor, and repeating the method with further one or more items. It is noted that a single item may also constitute a complete or partial batch within the scope of the invention, e.g. in situation where only one item should be packed in each tray, and/or where the items' weights vary, and the packaging is performed according to weight.

According to a preferred embodiment of the present invention, the method further comprises the step of opening a buffer arranged beneath the drop conveyor and having received the items dropped from said drop conveyor, so that the items are dropped from the buffer.

As described above, the inclusion of buffering between the drop conveyor and the item carrier provides several advantages.

In an embodiment where buffering is included, a method according to an embodiment of the present invention may advantageously, in order to facilitate repetition, comprise the step of evaluating if a complete batch of items has accumulated on the buffer, and if not, perform the following steps before the step of opening the buffer:
adjusting the side guides outwards,
closing the drop conveyor, and
repeating the method with further one or more items.

In order to facilitate the advantages of the present invention, an embodiment of the present invention may advantageously comprise that at least one item sensing device and/or information from upstream process units are employed to facilitate the positioning of the items on the drop conveyor, and/or the evaluation if a complete batch of items has accumulated.

To facilitate the production of the above-mentioned effects of the side guides, an embodiment of the present invention may advantageously comprise that the adjusting of the side guides into contact with the items, and the opening of the drop conveyor so the items are dropped, are carried out according to a predefined correspondence in order to avoid lateral dragging of the items relative to the drop conveyor and sticking of the items to the side guides.

THE DRAWINGS

Figure 11:
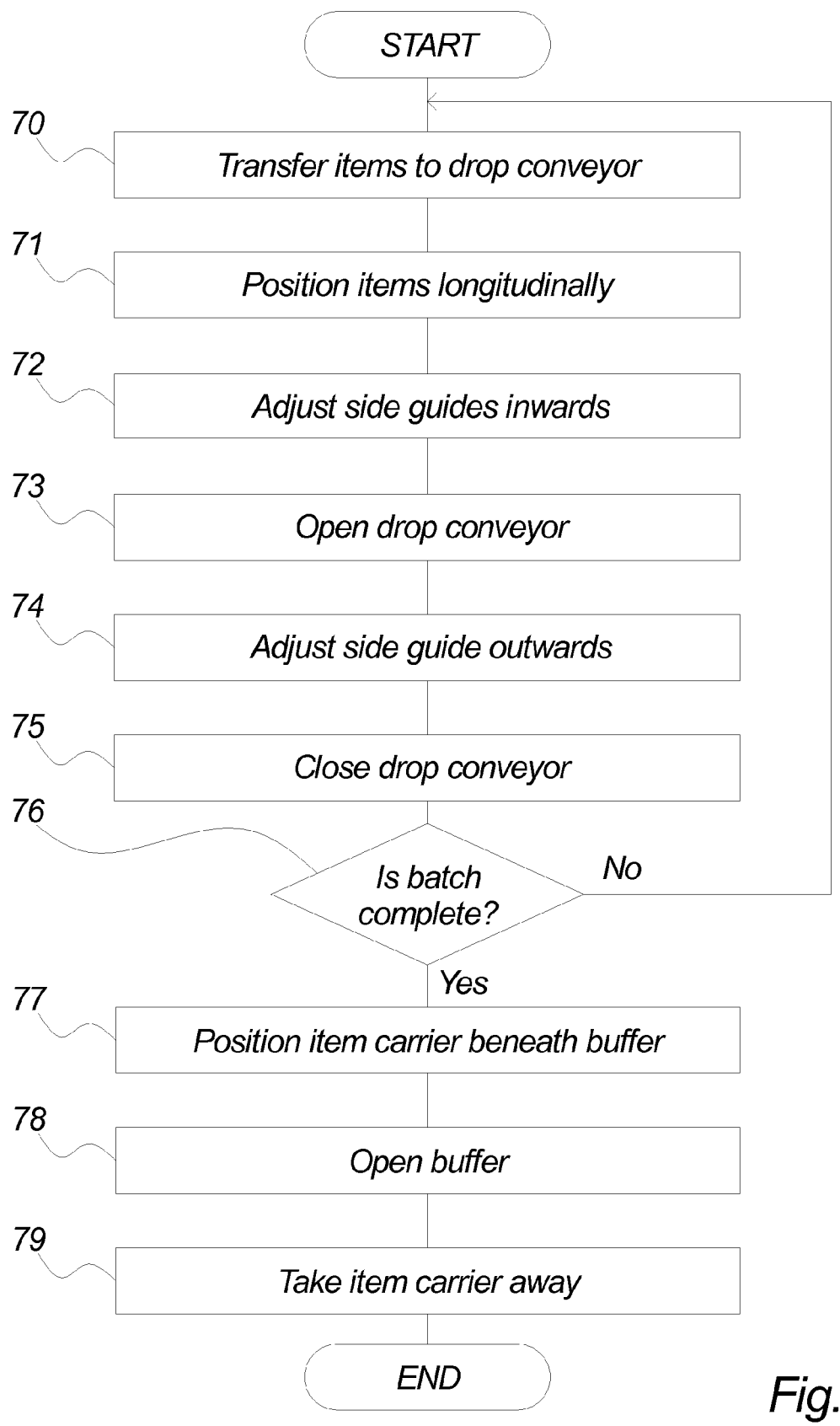
Figure 12:
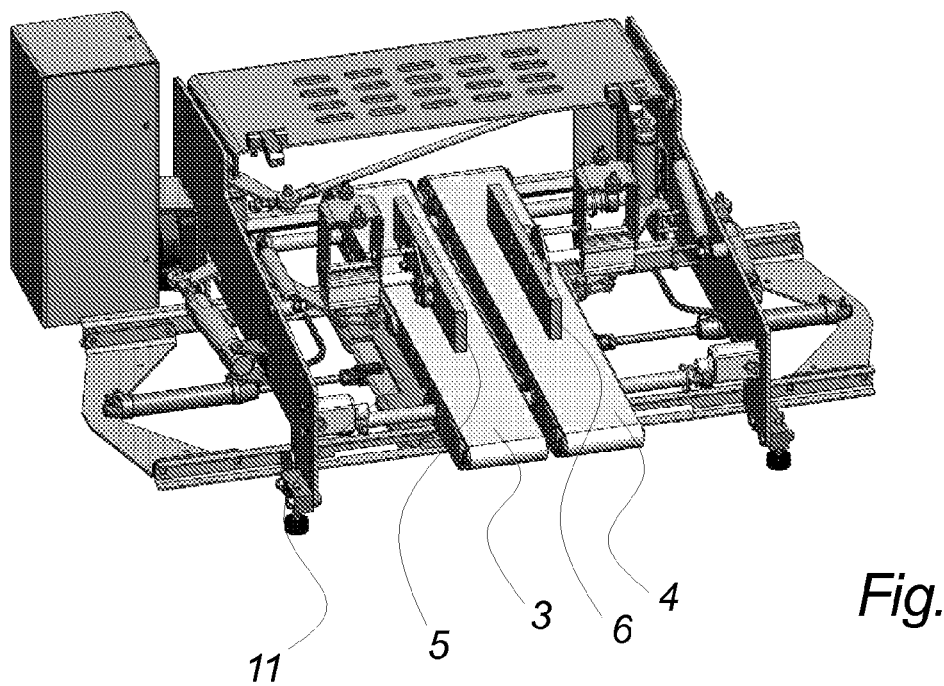
Figure 13:
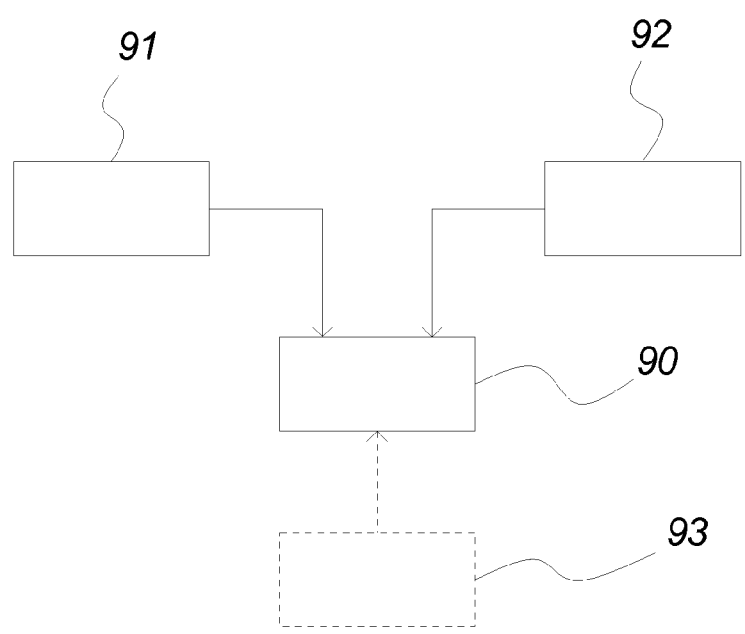

The invention will in the following be described with reference to the drawings where FIG. 1A-4B illustrate an embodiment of the invention, FIG. 5 is a flow chart illustrating a method according to the invention, FIG. 6A-10B illustrate an embodiment of the invention with buffer, FIG. 11 is a flow chart illustrating a method according to the invention with buffer, FIG. 12 illustrates an embodiment of an apparatus according to the invention, and FIG. 13 is a block diagram illustrating how an apparatus according to an embodiment of the invention can be controlled.

DETAILED DESCRIPTION

FIG. 1A-4B illustrates an apparatus and an item delivery procedure according to an embodiment of the invention. One or more items 2, possibly arranged in a shingle fashion as shown in the drawings, are delivered by a feeding conveyor 1 or other feeding means. The apparatus of the present invention comprises a drop conveyor comprising two conveyor sections 3, 4, arranged side-by-side and cooperating with the feeding conveyor 1 or other feeding means in such a way that the items 2, after being transferred to the drop conveyor, are supported substantially equally by the two conveyor sections 3, 4. In a preferred embodiment, the feeding conveyor 1 is simply positioned with its direction of transport corresponding to the direction of transport of the two conveyor sections 3, 4, and its longitudinal centre line corresponding to the longitudinal centre line of the, possibly small, gap between the two conveyor sections 3, 4, as shown in the drawings. Moreover, the feeding conveyor 1 is preferably arranged so close to the drop conveyor, and with a conveyor end configuration compatible with that of the conveyor sections 3, 4, so that the drop conveyor automatically takes over the transportation of the items 2 when they leave the feeding conveyor 1.

At a level below the drop conveyor a tray 8 or other suitable item carrier is positioned, preferably by means of a tray conveyor 7 or other transportation means for item carriers, which is arranged to bring empty trays 8 to the position beneath the drop conveyor, and take them away again after they have received one or more items 2a. In a preferred embodiment of the invention, the tray conveyor 7 has a direction of transport which is perpendicular to the direction of transport of the drop conveyor. In the example of FIG. 1A-4B, the transport direction of the tray conveyor is from right to left.

FIG. 1A illustrates the situation as seen from above at a time where the drop conveyor is still empty, and an empty tray is positioned and ready beneath the drop conveyor. A previous tray on the tray conveyor 7 now contains a plurality of items 2a arranged in a shingle fashion. A plurality of items 2 are being transported to the apparatus of the present invention on the feeding conveyor 1. FIG. 1B illustrates the same situation as FIG. 1A, but as seen from the end of the drop conveyor in a direction opposite the transport direction.

FIGS. 2A, 3A and 4A correspond to FIGS. 2B, 3B and 4B, respectively, in the same way as FIG. 1A corresponds to FIG. 1B, i.e. they illustrate the same situation from above and from the end, respectively.

FIGS. 2A and 2B illustrate the situation when the items 2 have been transferred from the feeding conveyor 1 to the drop conveyor. In terms of lateral displacement, the items 2 should preferably be placed substantially in the middle of the drop conveyor, i.e. with substantially equal support from each of the two conveyor sections 3, 4. In terms of longitudinal displacement, the items 2 can be placed at any desired position by stopping the conveyor sections' belts at the appropriate time. How this can be controlled will be described in more detail below.

If for some reason the items 2 that have been transferred to the drop conveyor should not be placed in a tray, they can be discharged simply by letting the conveyor sections' belts run until the items fall off the end of the drop conveyor, possibly into a trim bucket, or onto a waste conveyor, or any relevant carrier, or they can be recycled.

FIGS. 3A and 3B illustrate the situation when the items 2 have reached the desired position longitudinally, and the conveyor sections' belts therefore have been stopped. The drop conveyor further comprises two side guides 5, 6 placed above the conveyor sections 3, 4, and along their longitudinal directions. While the items 2 enter the drop conveyor and are transported to the desired position thereon, the side guides 5, 6 are maintained at relative outer positions to ensure that the width between them is sufficient to receive the items 2 without considerable engagement of the side guides. In a simple embodiment of the invention, the outer positions of the side guides are fixed in accordance with the expected width of item carriers and the items to be handled. The distance between the side guides are preferably adjusted to be a little more than the width of the item carrier, or, e.g. in case of oversized item carriers for bundling of different products, the width of the relevant area of the item carrier. In an advanced embodiment of the present invention, the side guides are adjustable, either manually at the machine, manually by means of software control, or automatically by means of software control. In such embodiments, the apparatus can handle different widths of item carriers and/or items.

When the items 2 have reached the desired position as shown in FIGS. 3A and 3B, the side guides 5, 6 are displaced inwards to a relative inner position where the items 2 are preferably engaged by the side guides 5, 6. In an embodiment of the invention, this is carried out in order to ensure that the items 2 will fit into the item carrier 8, by squeezing any too wide items a bit and/or displace any items that are not accurately centred laterally on the drop conveyor. Due to the stickiness of typical meat slices and the roughness of typical conveyor belts, it is in general not possible to displace the items considerably in the lateral direction, but this is not relevant either, as the items are placed substantially in the lateral centre of the drop conveyor in well-configured embodiments. Hence, the lateral adjustment of items carried out by the side guides 5, 6 should preferably only constitute a small adjustment if any. In an embodiment where considerable lateral fluctuation between items on the drop conveyor is expected, the conveyor sections 3, 4 should preferably be manufactured from a material that facilitates easy displacement of sticky items.

FIGS. 4A and 4B illustrates the situation when the items 2 are dropped into the item carrier 8. The drop conveyor opens by displacing the two conveyor sections 3, 4, outwards, i.e. away from each other in the lateral direction, until the opening between them is wide enough for the items 2 to slip through and, due to gravity, drop vertically into the tray 8 below. In a preferred embodiment, the conveyor sections 3, 4 should be displaced sufficiently to establish an opening wider than the items very fast in order for the items 2 to drop neatly. The floppier the items are, the greater is the risk that the items will bend on the middle or loose their grip in one of the conveyor sections and begin to drop too early and possibly fold or corrugate upon landing in the tray, and the more important is the requirement of fast displacement. In a preferred embodiment, the opening should e.g. be established in less than 400 ms, even better in less than 200 ms. The duration of the period where the drop conveyor is open is preferably adjustable, and should preferably depend on the material being dropped, i.e. the kind of items. In a preferred embodiment of the invention the drop conveyors 3, 4 are displaced synchronously, i.e. at approximately the same time and with comparable, yet oppositely-directed, speed, so that the lateral forces acting on the items 2 in opposite directions can be assumed to cancel each other and thereby minimize the risk of lateral displacement of the items 2. When the items 2 have been dropped into the tray 8, the drop conveyor is closed by displacing the conveyor sections 3, 4 back to their initial, adjacent positions, and the tray conveyor 7 transports the newly filled tray 8 away from the drop conveyor, and possibly a new, empty tray into the position beneath it, ready to receive the next batch of items.

In an embodiment of the invention, the side guides 5, 6 serve the purpose of retaining the items 2 at the desired position while the conveyor sections 3, 4 are being displaced. Because of the probably considerable and irregular stickiness of the items 2 onto the conveyor sections' belts, at least for the typical kinds of items, e.g. steaks of meat or poultry, and the typical kinds of conveyor belts, there is a high risk that the laterally moving belts will take the items with them to either side, even in an embodiment with synchronous displacement of both conveyor sections as mentioned above. As this would increase the risk of incorrectly placed or folded or corrugated items in the tray considerably, the side guides 5, 6 are provided to ensure that such displacement of the items 2 does not happen. In a preferred embodiment, where the side guides 5, 6 have been displaced to relative inner positions as described above with relation to FIGS. 3A and 3B, the side guides 5, 6 preferably maintain these positions for most of the conveyor sections' lateral displacement, but are displaced outwards to their relative outer positions during the last part of the conveyor sections' displacement so that they disengage the items at approximately the same time as the drop conveyor opening is wide enough for the items to drop through. If the side guides 5, 6 are maintained at their relative inner positions when the items 2 drop, there may be a risk that the items will stick to the side guides unevenly and thereby drop irregularly. However, in an alternative embodiment used with items where this risk is considered insignificant, it may be preferred to actually keep the side guides at relative inner positions where they squeeze the items sufficiently to obtain a small delay of the drop, thereby possibly ensuring that the items do not drop before the drop conveyor is completely open.

It is noted that, in a preferred embodiment, the displacement of the side guides 5, 6 can be carried out completely independent from the displacement of the conveyor sections 3, 4, both in terms of timing, speed and position. Thereby the same machine can be configured for any of the above-described embodiments at any time, either manually or automatically, e.g. in response to changed item types, different item carriers, or any other change in requirements, or it can be programmed with finely tuned timing for the displacement of side guides and conveyor sections that specifically handle particularities for each different kind of items, batches, trays, etc. These programs can comprise any of the above-described embodiments or combinations thereof. In a preferred embodiment of the invention, the side guides 5, 6 are displaced synchronously, i.e. at approximately the same time and with comparable, yet oppositely-directed, speed.

Regarding the longitudinal positioning of the items on the drop conveyor, in the example where the items 2 constitute a complete batch, the desired position is typically reached when the centre of the batch is positioned directly above the centre of the package tray. In an alternative embodiment, even complete batches may be desired to be placed towards an end or a side of a tray or other item carrier instead of in the centre, for example when further, typically different products are or will be placed in the same carrier for bundled sale. In a further alternative embodiment, the items 2 fed from the feeding conveyor 1 are not arranged in complete batches but rather individually or with a few items together. In this case the longitudinal positioning should ensure that the current items are placed neatly in the item carrier at the correct position when considering any items already placed in the carrier, and the number of remaining items that should be placed in the carrier. In an alternative embodiment, the items 2 are always transported to the centre or another well-defined position of the drop conveyor, and the item carrier beneath the drop conveyor is dislocated relative to the fixed position of the items to ensure correct placement of the items in the carrier.

FIG. 5 illustrates, by means of a flow chart, an embodiment of the item delivery method of the present invention. In the first step 51, an item carrier 8, e.g. a tray, is positioned beneath the drop conveyor, ready to receive one or more items. In the next step 52, one or more items 2 are transferred to the drop conveyor. As described above, the items should be placed substantially centred in the lateral direction of the drop conveyor, which is typically no problem. It is noted, that the order and timing of steps 51 and 52 are not significant, because they can be carried out independently of each other. Hence, in a preferred embodiment, the items are in fact transferred to the drop conveyor simultaneously with a new tray being positioned beneath it. In fact, the item carrier need not be finally in place before step 55 is carried out, and obviously such embodiments are also within the scope of the present invention.

In step 53, the items are being positioned at the desired longitudinal position. This is preferably performed by driving the conveyor sections' belts until the desired position is reached and then stop them. An explanation of desired position is given above. In short, the desired position is typically immediately above the position where the items are meant to be placed in the tray. For complete batches, this is typically the centre of the tray. How the positioning is controlled is described in more detail below.

In step 54, the side guides 5, 6 are displaced inwardly to relative inner positions as described above with reference to FIGS. 3A and 3B. In a preferred embodiment, this means that the side guides engage the items 2, and the items should therefore preferably have stopped moving prior to the engagement of the side guides.

In step 55, the drop conveyor is opened as described above with reference to FIGS. 4A and 4B and the items are thereby carried by gravity into the tray positioned beneath. As described in more detail above, the opening of the drop conveyor should preferably be considerably fast. In step 56, the side guides are adjusted outwards to their relative outer positions. As described in more detail above with reference to FIGS. 4A and 4B, the timing of the outward displacement of the side guides should preferably depend on, or be synchronised with, the timing of the displacement of the conveyor section so that the side guides have disengaged the item when the drop conveyor is opened sufficiently to let the items drop through. As also described above, other embodiments may require different timing of the side guide adjustments relative to the conveyor sections' displacement. Hence, the order and timing of steps 55 and 56 may be changed according to the relevant embodiment and preferably be carried out simultaneously; with different start times, however.

When the items have been dropped, the drop conveyor is closed as indicated by step 57. In accordance with the above elaboration of the side guide and conveyor displacement timing, it is noted that in some embodiments the side guides are only displaced to their initial, outer positions when the items have been dropped and the drop conveyor is closing. Hence, step 56 and 57 may overlap in some embodiment of the invention.

Step 58 is only relevant in embodiments that allow partial batches to be processed. In the case of solely complete batches, the batch is always finished, and "yes" can be answered each time, and the step therefore be skipped. In step 58, it is considered whether or not a batch is finished, i.e. whether or not the desired number of items has been placed in the item carrier. If the batch is incomplete, i.e. step 58 answered with a "no", the procedure returns to step 52 where the next items are transferred to the drop conveyor and the procedure repeated until the batch is complete, i.e. typically until the tray is full. If the batch is complete, i.e. step 58 is answered with a "yes", a step 59 is employed, where the item carrier is taken away, e.g. by means of a tray conveyor. If further batches should be processed, the procedure can be repeated by returning to START and position a new item carrier according to step 51, and so on.

FIG. 6A-10B illustrates an apparatus and an item delivery procedure according to an embodiment of the invention where a buffer arrangement is employed to provide further advantages. As regards the feeding conveyor 1 or other feeding means, the drop conveyor with two conveyor sections 3, 4 and side guides 5, 6, and the tray conveyor 7, the present embodiment resembles the embodiment described above with reference to FIGS. 1A-4B, and the alternatives and preferences mentioned above also apply, mutatis mutandis, to the present embodiment.

The difference between the previous and the present embodiments is that a buffer arrangement comprising two buffer plates 11, 12 is located between the drop conveyor and the item carrier.

FIGS. 6A, 7A, 8A, 9A and 10A illustrate the embodiment as seen from the end of the tray conveyor 7 in a direction opposite the transport direction, i.e. so that the feeding and drop conveyors are seen from the side with the items being transported from left to right in the drawing. The typically opaque side guide 5 has in the drawings, however, merely been outlined with dashes in order to be able to illustrate the items at the conveyor sections 3, 4.

FIG. 6A illustrates the situation at a time where a few items 2 have been transferred to the drop conveyor. On the basis of the fact that the items do not constitute a complete batch because of their limited number but that they constitute the first items of a new batch, they have been positioned so that the outer item's edge aligns with the edge of the tray 8, whereby sufficient space is left for the remaining items of the batch. The longitudinal positioning of items on the drop conveyor is facilitated by the conveyor sections 3, 4 that make up the drop conveyor and enable items to be moved forth, and even back, if necessary. Sensors, or sensors together with further information from scanning devices or upstream process units, provide the information required for controlling the positioning.

FIG. 6B illustrates the same situation as FIG. 6A, but as seen from the end of the drop conveyor in a direction opposite the transport direction. FIGS. 7A, 8A, 9A and 10A correspond to FIGS. 7B, 8B, 9B and 10B, respectively, in the same way as FIG. 6A corresponds to FIG. 6B, i.e. they illustrate the same situation from the side and from the end, respectively.

As visible in FIG. 6B, the buffer plates 11, 12 preferably comprise conveyor bands with a direction of transport perpendicular to the conveyor sections 3, 4 of the drop conveyor.

FIGS. 7A and 7B illustrate a situation where the items constituting the first part of a batch are dropped from the drop conveyor to the buffer arrangement by utilising the lateral displacement feature of the conveyor sections 3, 4 as described above. The buffer plates 11, 12 are maintained in a closed position in order to receive the items.

FIGS. 8A and 8B illustrate a situation where the next few items have been transferred to the drop conveyor. In the present example, these items also constitute the final part of the batch. By means of the longitudinal positioning feature of the drop conveyor, the items are positioned so that they will complement the first part of the batch neatly when dropped.

FIGS. 9A and 9B illustrate a situation where the items constituting the final part of the batch have been dropped to the buffer plates 11, 12. As illustrated, the two parts of the batch make up a neatly arranged complete batch on the buffer plates. It is noted that a batch may be made up of any number of partial batches according to the invention and that it is evident from the above, how the positioning should preferably be controlled. It is further noted that a single item also constitutes a partial batch, provided a batch include more than a single item. When items are delivered to the drop conveyor in partial batches comprising two or more items already arranged in a shingle fashion or other arrangements that include overlapping items, the partial batches should not comprise more items than needed for a batch and the final partial batch should comprise the exact number of items needed to complete the batch. If a partial batch comprising more items than needed to complete the batch is delivered to the drop conveyor, it may preferably be transported out of the end of the drop conveyor and preferably be recycled. Sensors or sensors in combination with information from e.g. upstream process units, e.g. a cutter, are utilised in order to control the partial batches and the number of items therein.

FIGS. 10A and 10B illustrate a situation where a complete batch is dropped from the buffer plates 11, 12 to the tray 8 by laterally displacing the buffer plates 11, 12 in the same manner as described above with regard to the conveyor sections 3, 4, mutatis mutandis. By utilising the fact that the drop conveyor is not needed for the drop from the buffer arrangement to the item carrier, a new partial batch of items has been transferred to the drop conveyor at the same time as the complete batch is dropped into the tray.

As mentioned above and illustrated in the drawings, the buffer plates 11, 12 preferably comprises conveyor bands with a direction of transport perpendicular to the conveyor sections 3, 4 of the drop conveyor. The direction of transport of the buffer plate conveyors should, moreover, be towards each other, as illustrated by the curved arrows in FIG. 10B. By employing this preferred arrangement in a way that the buffer plate conveyors are driven with a speed corresponding to the speed at which the buffer plates are laterally displaced during a drop, the effect that the upper surface of the buffer plate conveyors does actually not move, when compared with the fixed parts such as the framing, except for the part that wraps under the buffer plates is obtained. The advantage of this effect is that the part of the buffer plate conveyors that still supports the items located on the buffer plates at a certain time during the displacement, i.e. the opening of the buffer arrangement, does not move with respect to the items, either. In other words, the lateral displacement of the buffer plates only produces an effect comparable to rolling off onto the items and a horizontal displacement of the upper surface of the buffer conveyor belts during the displacement of the buffer plates is avoided. Without the conveyors, the displacement of the buffer plates would likely drag the items because of the stickiness of the items and the roughness of the conveyor belts.

As indicated above, the above-mentioned effect could be produced by conventionally driving the buffer plate conveyors, e.g. with servo motors, and carefully timing the driving thereof with the displacement of the buffer plates. In a preferred embodiment, the buffer plate conveyors are, however, simply fixed to the framing at a point sufficiently far from the lateral centre of the drop conveyor to avoid conflict with the wrapping over the end of the buffer plate when completely displaced. Thereby it is ensured in a simple way that the conveyor bands are fixed with respect to the framing and the items, while still enabling the buffer plates to displace and establish the opening through which the items are dropped into the tray.

In an alternative embodiment, the buffer plates are simply fixed plates of any kind, and a pair of side guides may be provided to produce an effect as described with respect to the side guides of the drop conveyor above.

In an alternative embodiment, the buffer plates comprise conveyors with a transport direction equal to the drop conveyor's conveyor sections. Thereby, the buffer plates can also be used to position the items or a batch longitudinally before a drop.

FIG. 11 illustrates by means of a flow chart an embodiment of the item delivery method including the buffer feature of the present invention. In the first step 70, one or more items 2 are transferred to the drop conveyor, e.g. from a feeding conveyor 1. As described above, the items should be placed substantially centred in the lateral direction of the drop conveyor, which is typically no problem.

In step 71, the one or more items are being positioned at the desired longitudinal position in the same way as described with reference to FIG. 5 step 53 above. Likewise, the adjustment of the side guides according to step 72 is described above with reference to FIG. 5 step 54.

In step 73, the drop conveyor is opened and the items are thereby carried by gravity down to the buffer positioned beneath. In step 74, the side guides are adjusted outwards to their relative outer positions. The elaborations above regarding opening speed, timing of side guides and conveyor displacement, etc., apply equally to the present embodiment of FIG. 11 where the items are dropped to a buffer instead of directly into the tray. When the items have been dropped onto the buffer, the drop conveyor is closed as indicated by step 75, and it is again noted that the steps 74 and 75 may overlap.

In step 76, it is considered whether or not a batch is finished, i.e. whether or not the desired number of items has been placed on the buffer. If the batch is incomplete, i.e. step 76 answered with a "no", the procedure returns to step 70 where the next items are transferred to the drop conveyor and the procedure repeated until a complete batch is ready on the buffer. If the batch is complete, i.e. step 76 is answered with a "yes", a step 77 is employed where an item carrier is positioned beneath the buffer, followed by steps 78 where the buffer is opened and the complete batch dropped into the carrier and step 79 where the item carrier is taken away, e.g. by means of a tray conveyor. The buffer is closed again after the batch has been dropped.

It is noted that the present embodiment utilising an intermediate buffer also facilitates that a new repetition of the procedure is started before the previous is finished. Hence, it is possible to begin step 70 and engage the drop conveyor for the next number of items as soon as the last items have been dropped onto the buffer and completed the batch thereon. Obviously, the next repetition has to wait between steps 72 and 73 until the buffer has been emptied and is closed again, but (anyway) it is possible to carry out steps 70-72 even while steps 77-79 from the previous repetition are being carried out. This facilitates a sufficient efficiency increase in addition to the main reason for using the buffers, i.e. avoiding that the trays in a large system with several drop conveyors have to wait for incomplete batches to finish.

FIG. 12 illustrates an embodiment of a complete item delivery apparatus according to the present invention. It comprises a drop conveyor with two conveyor sections 3, 4, two side guides 5, 6, and two buffer plates 11, 12, of which only one can be seen in the drawing. It further illustrates the driving mechanisms utilised in an embodiment of the invention to drive the conveyor sections 3, 4 and to displace the conveyor sections, side guides and buffer plates laterally.

FIG. 13 illustrates an embodiment of the present invention where the different control or input units are shown. The embodiment comprises an item delivery apparatus 90 according to the present invention, i.e. comprising a drop conveyor and possibly a buffer, and is arranged to cooperate with an item feed mechanism, e.g. a feeding conveyor and an item carrier system, e.g. a tray conveyor with trays.

The embodiment further comprises a control unit 91, preferably a hardware structure comprising processing means, memory and communication means, and loaded with suitable software. The control unit may comprise a central overall control unit controlling several process units, e.g. weighers, cutters, sorters, batchers, loaders, packagers, etc., in addition to one or more item delivery apparatuses 90 according to the present invention. Alternatively, or in addition thereto, a control unit 91 may be specifically adapted to control the item delivery apparatus 90, or a single processing line e.g. comprising a cutter, a tray conveyor and an item delivery apparatus 90.

The control unit 91 may provide the item delivery apparatus 90 with information about the number of items that should be included in each batch, or the control unit 91 could simply inform the item delivery apparatus 90 when the batch is complete.

The embodiment further comprises input means 92 such as sensors. Sensors should preferably be arranged at the drop conveyor to observe the beginning of an item. By combining knowledge of the conveyor speed with the time an item is spotted by the sensors, it is possible to track the item and estimate its longitudinal position relative to the tray below, provided the tray position is sensed or known. For embodiments that only handle complete batches, this positioning information is sufficient to ensure that the batches are dropped accurately in the trays.

The embodiment further possibly comprises control information coming from a process unit 93 upstream at the processing line, e.g. a portioning device. In a preferred embodiment of the present invention, the portioning device provides information about the number of items that are arranged together, ranging from one item to a complete batch of items, possibly together with information about start and end of each set of items. Such information facilitates the handling of incomplete batches, because it allows the item delivery apparatus 90 to know how many times it should drop items into the same tray and at which longitudinal positions they should be dropped in order to be placed neatly. Moreover, information from an upstream unit 93, e.g. a portioning device, may be used to tell the item delivery apparatus 90 when to reject items, e.g. end pieces between batches of usable items, by simply letting them run off the drop conveyor.

Obviously several other, and much more advanced, control algorithms can be employed to make use of information form several processing units in order to optimise efficiency and quality everywhere, including at the item delivery apparatus 90.

As regards the actuation of the mechanical parts of the different embodiments of the invention, e.g. displacing the drop conveyor's conveyor sections and side guides and the buffer plates, as well as driving the different conveyors, any suitable combination of actuators and actuation technologies are within the scope of the present invention, including, but not limited to, electrical motors or actuators, hydraulic actuators, pneumatic actuators, vacuum-controlled actuators, etc. The actuators and controllers could preferably apply servo-mechanisms to facilitate accurate control.

The invention claimed is:

1. An apparatus for delivering one or more items to a desired position on an item carrier, said apparatus comprising a drop conveyor comprising two conveyor sections that are laterally displaceable and controllable in order to enable dropping said one or more items at a desired position along the length of the drop conveyor,
wherein said drop conveyor comprises guide means placed above the two conveyor sections, said guide means being laterally displaceable and controllable, and configured to move towards each other, and wherein
said guide means are further being configured to move away from each other according to a predefined correspondence with said displacement of said conveyor section.

2. The apparatus according to claim 1, wherein said guide means are arranged for retaining said one or more items when said two conveyor sections are displaced laterally.

3. The apparatus according to claim 1, wherein said guide means are configured to move towards each other in order to contact said one or more items prior to the two conveyor sections being displaced laterally.

4. The apparatus according to claim 1, wherein said guide means are configured to move away from each other according to a predefined correspondence with a displacement of said conveyor sections.

5. The apparatus according to claim 1, wherein said apparatus comprises a buffer arranged beneath said drop conveyor so as to receive said one or more items being dropped, said buffer comprising two buffer plates that are laterally displaceable and controllable in order to enable dropping said one or more items from said buffer.

6. The apparatus according to claim 1, wherein said item carrier is a package tray.

7. The apparatus according to claim 1, wherein said one or more items comprise sliced or chopped food items.

8. The apparatus according to claim 1, wherein at least two of said items are arranged in said item carrier in a shingle fashion.

9. An apparatus according to claim 1, wherein said guide means are configured to move towards each other in order to contact said one or more items.

10. An apparatus according to claim 1, wherein said guide means are configured to move towards each other prior to the two conveyor sections being displaced laterally.

11. An apparatus according to claim 1, wherein said predefined correspondence with said displacement of said conveyor section is configured so that the side guides have disengaged the one or more items when the drop conveyor is opened sufficiently to let the one or more items drop through.

12. An apparatus according to claim 1, wherein said guide means are configured to hold the one or more items in place during said lateral displacement of the conveyor sections.

13. The apparatus according to claim 5, wherein said buffer comprises buffer guide means placed above the two buffer plates, said buffer guide means being laterally displaceable.

14. The apparatus according to claim 5, wherein said buffer plates comprise buffer conveyor belts arranged with their direction of transport towards each other.

15. The apparatus according to claim 14, wherein said buffer conveyor belts cooperate with said buffer plates to avoid a horizontal displacement of the upper surface of said buffer conveyor belts during a displacement of said buffer plates.

16. The apparatus according to claim 14, wherein said buffer conveyor belts cooperate with fixed structure of said apparatus to avoid a horizontal displacement of the upper surface of said buffer conveyor belts during a displacement of said buffer plates.

17. The apparatus according to claim 1, wherein said two conveyor sections and said guide means are coupled directly or indirectly to a control unit for receiving control signals.

18. The apparatus according to claim 17, wherein said control unit is coupled to as least one item sensing device to receive information that facilitate establishing batches according to predefined parameters.

19. The apparatus according to claim 17, wherein said control unit is coupled to at least one item sensing device to receive information that facilitates dropping said one or more item at a desired position along the length of the drop conveyor.

20. The apparatus according to claim 17, wherein said control unit is coupled to at least one process unit located upstream from said apparatus, to receive information that facilitate dropping said one or more item at a desired position along the length of the drop conveyor.

21. The apparatus according to claim 17, wherein said control unit is coupled to as least one process unit located upstream from said apparatus, to receive information that facilitate establishing batches according to predefined parameters.

22. A method of delivering one or more items to a desired position on an item carrier, said method comprising the steps of:
positioning said item carrier beneath a drop conveyor,
transferring one or more items to said drop conveyor,
positioning said one or more items on said drop conveyor,
adjusting side guides into contact with said one or more items that are positioned on said drop conveyor by moving said guides toward each other, and
opening said drop conveyor so that said one or more items are dropped, and moving said guides away from each other.

23. A method according to claim 22, further comprising the step of:
evaluating if a complete batch of items has accumulated in said item carrier, and if not, performing the steps of
closing said drop conveyor, and
repeating said method with further one or more items.

24. A method according to claim 22, wherein at least one item sensing device is employed to facilitate said step of positioning said one or more items on said drop conveyor.

25. A method according to claim 22, wherein said steps of
adjusting said side guides into contact with said one or more items, and
opening said drop conveyor so that said one or more items are dropped, are carried out according to a predefined correspondence in order to avoid lateral dragging of said items relative to said drop conveyor and sticking of said items to said side guides.

26. The method according to claim 22, wherein at least one item sensing device is employed to facilitate said step of evaluating if a complete batch of items has accumulated.

27. The method according to claim 22, wherein information from upstream process units is employed to facilitate said step of positioning said one or more items on said drop conveyor.

28. The method according to claim 22, wherein information from upstream process units is employed to facilitate said step of evaluating if a complete batch of items has accumulated.

29. A method according to claim 22, further comprising the step of: opening a buffer arranged beneath said drop conveyor and having received said one or more items dropped from said drop conveyor, so that said one or more items are dropped from said buffer.

30. A method according to claim 29, further comprising the steps of:
evaluating if a complete batch of items has accumulated on said buffer, and if not, perform the following steps before said step of opening said buffer:
closing said drop conveyor, and
repeating said method with further one or more items.

31. An apparatus for delivering one or more items to a desired position on an item carrier, said apparatus comprising a drop conveyor comprising two conveyor sections having carrier surfaces arranged in a plane that are laterally displaceable and controllable in order to enable dropping said one or more items at a desired position along the length of the drop conveyor,
wherein said drop conveyor comprises guide means placed above the two conveyor sections, said guide means being laterally displaceable and controllable including being configured to move towards each other and also being configured to move away from each other according to a predefined correspondence with a displacement of said conveyor sections.

32. An apparatus for delivering one or more items to a desired position on an item carrier, said apparatus comprising a drop conveyor comprising two conveyor sections that are laterally displaceable and controllable in order to enable dropping said one or more items at a desired position along the length of the drop conveyor,
wherein said drop conveyor comprises guide means placed above the two conveyor sections, said guide means being laterally displaceable and controllable for guiding one or more of said items, as a whole, in conjunction with lateral displacement of said conveyor sections.

33. An apparatus for delivering one or more items to a desired position on an item carrier, said apparatus comprising a drop conveyor comprising two conveyor sections that are laterally displaceable and controllable in order to enable dropping said one or more items at a desired position along the length of the drop conveyor,
wherein said drop conveyor comprises guide means placed above the two conveyor sections, said guide means configured for holding the one or more items in place during said lateral displacement of the conveyor sections, said guide means also being configured such that, subsequent to the lateral displacement of the conveyor sections, the guide means move synchronously apart to allow the one or more items to drop.

34. An apparatus for delivering one or more items to a desired position on an item carrier, said apparatus comprising a drop conveyor comprising two conveyor sections that are laterally displaceable and controllable in order to enable dropping said one or more items at a desired position along the length of the drop conveyor,
wherein said drop conveyor comprises guide means placed above the two conveyor sections, said guide means being laterally displaceable and controllable, and wherein
said guide means are configured to move towards each other in order to contact said one or more items prior to the two conveyor sections being displaced laterally.

* * * * *